United States Patent [19]

Uri

[11] Patent Number: 4,890,817
[45] Date of Patent: Jan. 2, 1990

[54] QUARTER-TURN VALVE

[75] Inventor: Ehud Uri, Kibbutz Maagan Michael, Israel

[73] Assignee: Plasson Maagan Michael Industries, Ltd., Kibbutz Maagan Michael, Israel

[21] Appl. No.: 153,180

[22] Filed: Feb. 8, 1988

[30] Foreign Application Priority Data

May 15, 1987 [IL] Israel .......................................... 82540

[51] Int. Cl.⁴ ................................................ F16K 5/04
[52] U.S. Cl. ..................................... 251/312; 137/327; 251/900; 251/904
[58] Field of Search ............................. 137/625.32, 327; 251/288, 309, 312, 357, 366, 900, 904

[56] References Cited

U.S. PATENT DOCUMENTS

| | | | |
|---|---|---|---|
| 2,994,341 | 8/1961 | Leopold, Jr. et al. | 251/288 X |
| 3,481,367 | 12/1969 | Deuschle | 251/309 X |
| 3,802,457 | 4/1974 | Wurzburger | 137/327 |
| 4,073,314 | 2/1978 | Speelman et al. | 251/288 X |
| 4,262,880 | 4/1981 | Danko et al. | 251/317 |
| 4,524,807 | 6/1985 | Toliusis | 137/327 X |

Primary Examiner—John Fox
Attorney, Agent, or Firm—Benjamin J. Barish

[57] ABSTRACT

A quarter-turn valve comprises a housing formed with a cylindrical socket, and a cylindrical plug receivable within the socket and having a bore extending diametrically through the plug for establishing communication between the inlet and outlet nipples in the open position of the plug, but terminating the communication when the plug is turned to its closed position one-quarter turn from the open position. The plug is formed with a finger-piece projecting from the housing for manually rotating the plug to its open, closed or an intermediate position. The plug is closed at its bottom, such that the fluid flowing through the bore subjects the plug to a fluid pressure which is balanced on all sides of the plug, thereby facilitating turning of the plug and preventing its accidental ejection when subjected to a high pressure.

11 Claims, 4 Drawing Sheets

QUARTER-TURN VALVE

BACKGROUND OF THE INVENTION

The present invention relates to valves, and particularly to the quarter-turn valve which is manually turnable one-quarter turn to open or close the valve.

One known type of quarter-turn valve comprises a housing formed with a cylindrical socket, and a cylindrical plug receivable within the socket. The housing includes an inlet nipple at one side of the socket, and an outlet nipple at the diametrically opposite side of the socket. The cylindrical plug receivable within the socket has a bore extending diametrically through the plug for establishing communication between the inlet and outlet nipples in the open position of the plug, but terminating the communication when the plug is turned one-quarter turn from the open position. The plug is further formed with a finger-piece projecting from the housing for manually rotating the plug to its open, closed or an intermediate position.

In one known valve of this type, the plug is open at its bottom, and is retained in the socket by a screw-and-slot connection, which connection also limits the open and closed positions of the plug. In such an arrangement, the fluid pressure urges the plug outwardly of the socket, against its screw-and-slot connection. This imposes a retarding force against manually turning the plug to its open or closed position. Moreover, there is great danger of accidental ejection of the plug from the socket in the event of an excessively high pressure.

In addition, in the above-described known quarter-turn valve, the sealing rings, which are disposed within annular recesses formed in the plug, tend to unseat from the plug as they pass through the nipple openings when the plug is rotated within the socket. Further, in this type valve, it is difficult to manually remove the plug from the socket for repair or maintenance purposes.

An object of the present invention is to provide a quarter-turn valve having advantages in the above respects.

BRIEF SUMMARY OF THE INVENTION

According to one feature of the present invention, the plug is closed at its bottom such that the fluid flowing through the bore subjects the plug to a fluid pressure which is balanced on all sides of the plug, thereby facilitating turning of the plug and preventing its accidental ejection when subjected to a high pressure. The cylindrical plug is formed with a circular recess for receiving an annular sealing ring on each of the two diametrically opposite sides of the plug midway between the ends of the bore, the sealing ring being aligned with the passageways through the inlet and outlet nipples in the closed position of the plug. In addition, the housing is further formed with cross-bars extending across the nipple openings to prevent unseating of the sealing rings during the rotation of the plug from its closed to its open positions.

According to a further feature, the bottom wall of the housing is formed with an opening therethrough communicating with the socket to vent the socket to the atmosphere and thereby to facilitate the manual removal of the plug from the socket for repair or maintenance purposes.

According to a still further feature, the bottom wall of the housing is formed with axially-extending ribs received within axially-extending cavities formed in the bottom wall of the plug for limiting the open and closed rotary positions of the plug with respect to the socket.

According to a still further feature, the plug is formed with an annular rib at one end adjacent to its finger-piece, which rib is receivable with a snap-action in an annular recess formed in the corresponding end of the socket.

According to a still further feature, one end of the plug, and the corrresponding end of the socket, are formed with radially-extending projections defining a slot for the reception of a screwdriver or similar implement for prying the plug out of the socket.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
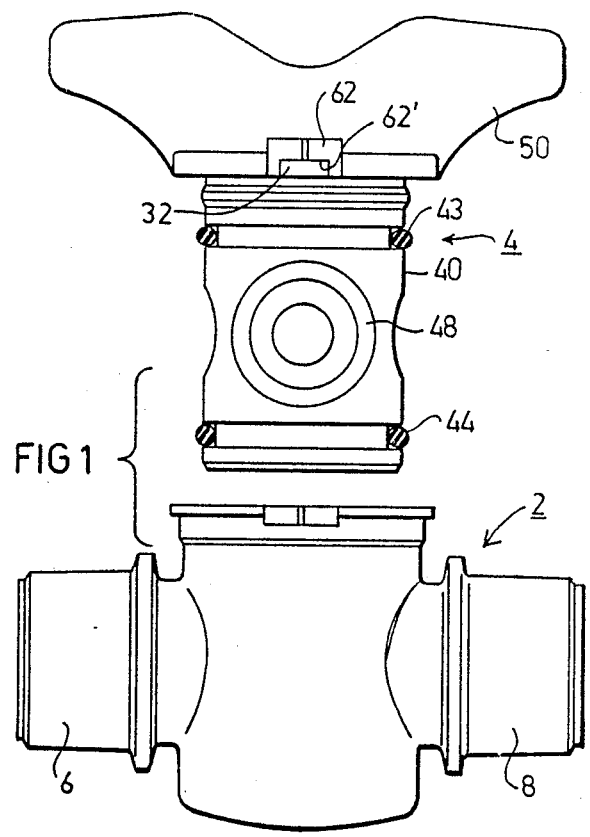
FIG. 1 is an exploded view illustrating the housing and plug in a quarter-turn valve constructed in accordance with the present invention.
Figure 2:
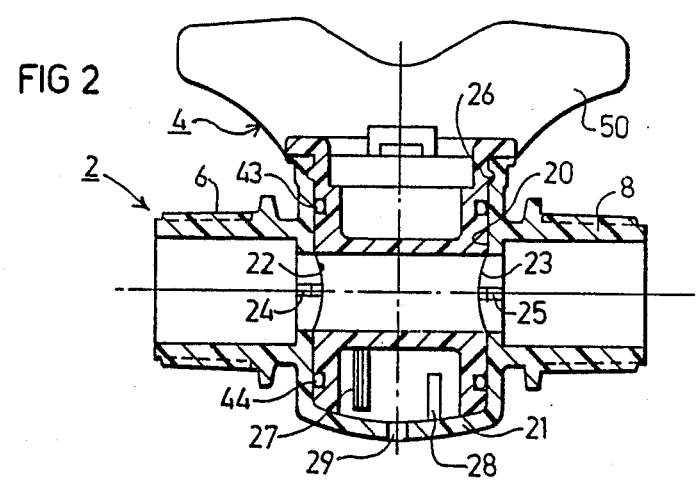
FIG. 2 is a sectional view illustrating the valve in its assembled condition with the plug in its open position.
Figure 3:
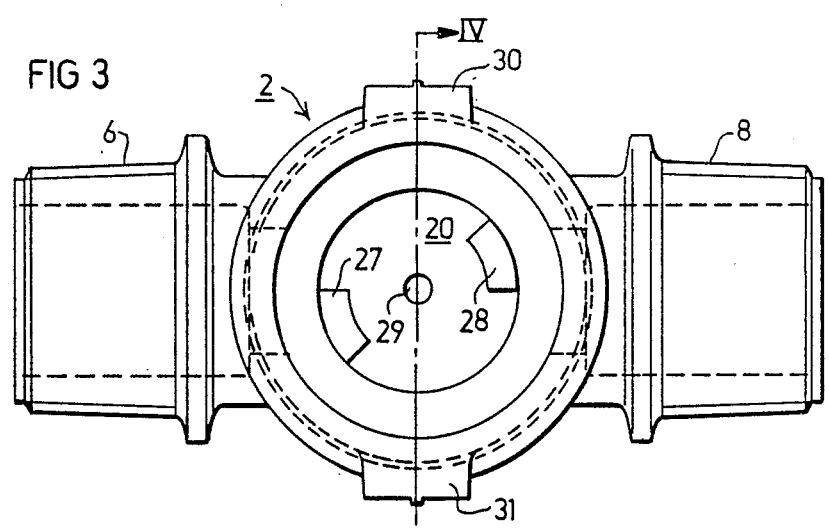
FIG. 3 is a top plan view of the housing alone.

The quarter-turn valve illustrated in FIGS. 1 and 2 comprises two parts, namely a housing, generally designated 2, formed with a cylindrical socket; and a plug, generally designated 4, receivable within the housing socket. Housing 2 further includes an inlet nipple 6 and an outlet nipple 8 at the opposite sides of the housing, both nipples being externally threaded for connection to inlet and outlet pipes (not shown). As will be described more particularly below, plug 4 is formed with a bore extending diametrically through it for establishing communication between the inlet and outlet nipples 6, 8 in the open rotary position of the plug, shown in FIG. 2, but terminates the communication between the two nipples when the plug is turned one-quarter turn.

Housing 2 is further formed with a cylindrical socket 20 open at its top for the insertion of plug 4, and closed at its bottom 21. Socket 20 includes a central opening 22 at one side communicating with the inlet nipple 6, and another opening 23 at the diametrically opposite side communicating with the outlet nipple 8. A cross-bar 24, 25 is integrally formed with socket 20 to extend across each of the two openings 22, 23, circumferentially of the socket so as to extend in the direction of rotation of the plug 4 when inserted into the socket.

The inner surface of the socket is formed, at its upper end, with an annular recess 26 for releasably receiving the plug 4. In addition, the bottom wall 21 of the socket includes a pair of diametrically-opposed ribs 27, 28 extending axially of the socket; these ribs cooperate with the bottom of the plug 4, as will be described below, to limit the open and closed quarter-positions of the plug.

Figure 4:
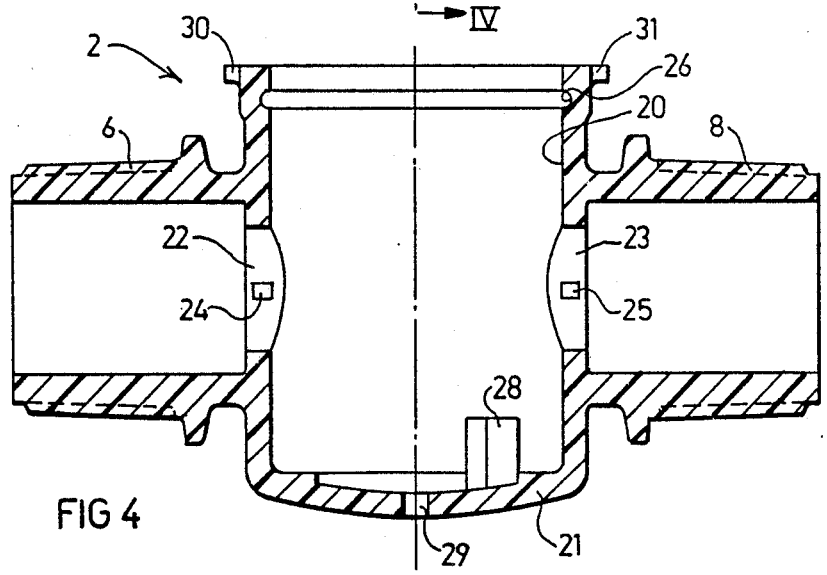
FIG. 4 is a sectional view along line IV—IV of FIG. 3.

The bottom wall 21 of the socket is further formed with an opening 29 therethrough, serving to vent the interior of the socket in order to permit the manual removal of the plug for repair and maintenance purposes. In addition, the upper end of the socket is integrally formed, on its outer face, with a pair of radially-extending projections 30, 31 (FIG. 4); these projections cooperate with similar projections in the plug to define a slot 32 (FIG. 1) for the reception of a screwdriver or similar implement for prying the plug out of the socket, when manually removing the plug for repair and maintenance purposes.

The plug 4, as more particularly illustrated in FIGS. 7-10, comprises a cylindrical section 40 (FIG. 8) snugly receivable within cylindrical socket 20 of the housing 2. A pair of annular recesses 41, 42, are formed in the opposite sides of cylindrical section 40 of the plug for the reception of annular sealing rings 43, 44 (FIG. 2) engageable with the faces of the socket 20 for sealing cylindrical section 40 of the plug within the socket.

Cylindrical section 40 of plug 4 is further formed with a bore 45 extending diametrically through the plug for establishing communication between the inlet and outlet nipples 6, 8 in the open rotary position of the plug, as shown in FIG. 2.

The cylindrical section 40 of plug 4 is further formed with a circular groove 46 exactly midway between the open ends of its through-going bore 45 on one side of plug section 40, and with a second circular groove 47 in the same location on the other side of the plug. Each of the two circular recesses 46, 47 receives a circular sealing ring, as shown at 48 in FIG. 1.

Plug 4 is integrally formed with a finger-piece 50 extending diametrically across its upper end of the plug and projecting therefrom a significant distance so as to conveniently enable the user to manually grip the finger piece and to rotate the plug. The plug may be thus rotated one-quarter turn to either its open position, wherein through-going bore 45 is aligned with the inlet and outlet nipples 6, 8, or to its closed position, wherein the sealing rings 48 received within the circular grooves 46, 47, are aligned with the nipples.

The upper face of plug 4 is formed with a pair of arrows 51, 52 (FIG. 7), and markings 53, 54, to indicate the direction of rotation of the plug in order to open or close the valve. Thus, arrow 51 and the "O" marking 53 indicates that the valve is to be rotated counter-clockwise to open the valve; and arrow 52 and the "C" marking 54 indicates that the plug is to be rotated clockwise in order to close the valve.

Bore 45 through the cylindrical section 40 of the plug is closed by a curved top wall 55 and a curved bottom wall 56. Wall 56 is displaced inwardly of the bottom 57 of the plug so as to define a cavity 58 at the bottom of the plug. The bottom of the plug is further formed with a pair of radially-extending ribs 59, 60 which effectively divide cavity 58 into two smaller cavities 58a, 58b. These cavities cooperate with the axially-extending ribs 27, 28 in the bottom wall 21 of housing 2 to limit the rotation of the plug to a one-quarter turn.

In addition, the upper end of cylindrical section 40 of the plug 4 is formed with an annular rib 61 receivable with a snap-fit into the annular recess 26 formed at the upper end of socket 20 so as to firmly, but releasably, retain the plug within the socket.

The upper face of the plug 4 is includes a pair of projections 62, 63 at diametrically opposite sides of the plug to overlie projections 30, 31 formed in the upper face of the socket 20. Projections 62, 63 are recessed at their lower faces, as shown at 62' in FIG. 1, so as to define with projection 30 and 31, the slot 32 (FIG. 1) on each of the two opposite sides of the valve for the reception of a screwdriver or similar implement in order to pry the plug out of the socket for purposes of maintaining or repairing the valve.

The valve illustrated in the drawings may be used in the following manner:

In order to assemble the valve, it is only necessary to insert cylindrical section 40 of the plug 4 into socket 20 of the housing 2 with sufficient force so as to snap annular rib 61 of the plug into annular recess 26 of the socket. The plug may then be manually rotated by its finger-piece 50 to either the valve-open position illustrated in FIG. 2 wherein the through-going bore 45 in the plug is aligned with openings 22, 23 of the inlet and outlet nipples 6, 8, or to its valve-closed position wherein the sealing rings, e.g., 48 (FIG. 1), received within the circular recesses 46, 47 of the plug are aligned with the nipple openings 22, 23.

It will be seen that since bore 45, through which the pressurized fluid is conducted, is closed by bottom wall 56, the pressure of the fluid within the bore will subject the plug to pressure which is balanced on all sides; this not only simplifies the manual rotation of the plug within the socket, but also prevents accidental ejection of the plug from the socket should the plug be subjected to an unduly high pressure. Annular rib 61 formed in the plug and received within annular groove 26 formed in the socket, securely holds the plug within the socket; and the axially-extending ribs 27a, 27b formed in the bottom wall 21 of the housing, receivable within cavity sections 58a, 58b formed in the bottom of the plug, limit the rotation of the plug to a one-quarter turn in either direction. The direction of rotation of the plug in order to open or close the valve is clearly indicated by arrows 51, 52 and legend markings 53, 54 (FIG. 7) in the upper face of the plug.

If it is desired to manually remove the plug from the socket, for purpose of repair or replacement of parts, this may easily be done by merely inserting a screwdriver or other like implement into slot 32 formed between the plug and socket, and then prying the plug out of the socket.

Figure 5:
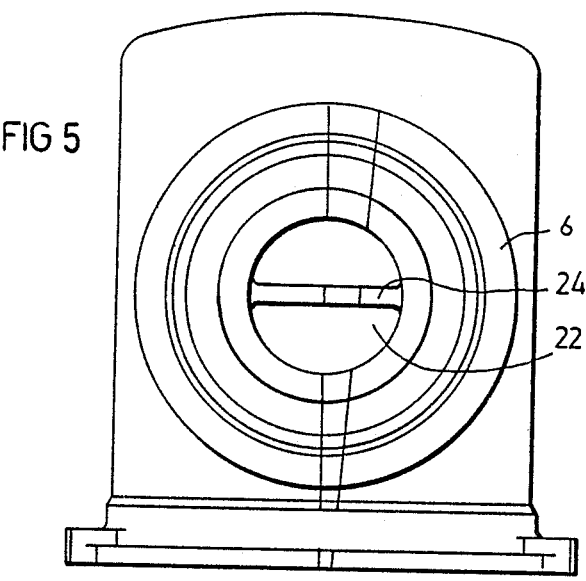
FIG. 5 is a side elevational view of the housing of FIG. 3.

A further advantage in the disclosed structure is that the cross-bars 24, 25, integrally formed in openings 22, 23 of socket 20, prevent the sealing rings, e.g., 48 (FIG. 1), from unseating from their respective circular grooves 46, 47 during the rotation of the plug from its closed position, when these sealing rings are aligned with the openings 22, 23 of the nipples 6, 8, to the closed position of the plug. In the construction illustrated, e.g., in FIG. 5, these cross-bars 24, 25 are single bars extending diametrically across the nipple openings 22, 23 in the direction of rotation of the plug.

Figure 6:
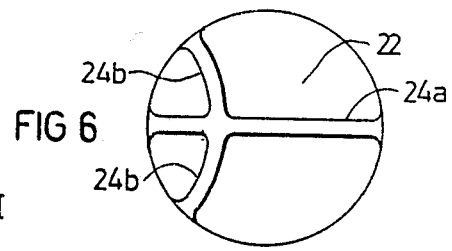
FIG. 6 illustrates a modification in the construction of the housing of FIG. 3.
Figure 7:
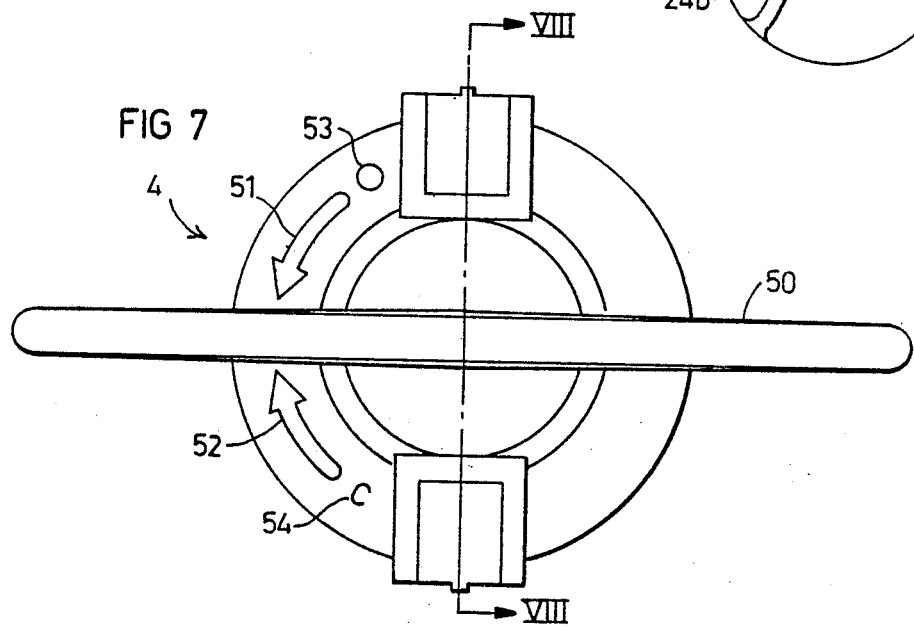
FIG. 7 is a top plan view of the plug alone.
Figure 8:
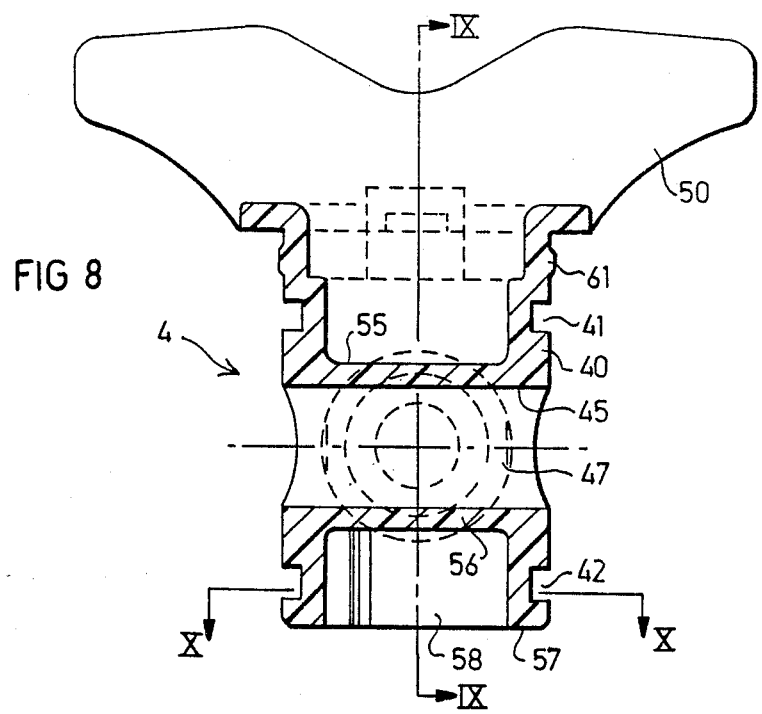
FIG. 8 is a sectional view along line VIII—VIII of FIG. 7.
Figure 9:
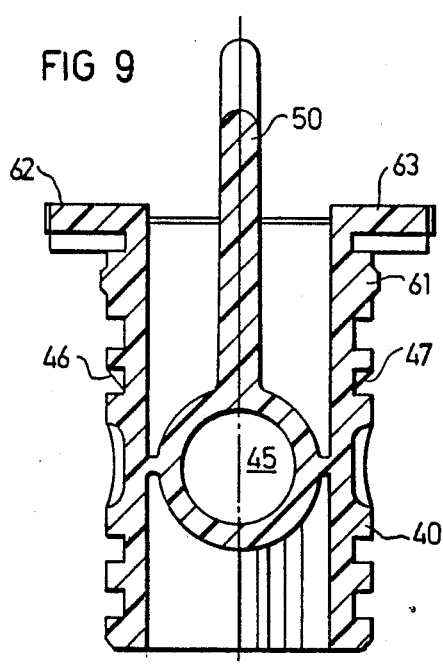
FIG. 9 is a sectional view along line IX—IX of FIG. 8.
Figure 10:
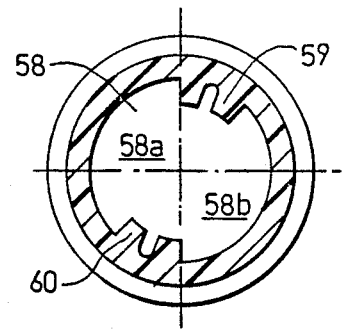
FIG. 10 is a sectional view along line X—X of FIG. 8.

FIG. 6 illustrates a variation which better assures protection against unsealing of the sealing rings, particularly in large size openings. In the variation illustrated in FIG. 6, the cross-bars are of psi-configuration, including a central leg 24a, corresponding to cross-bars 24 and extending in the direction and rotation of the plug within the socket, and a pair of legs 24b extending from an intermediate position of the central leg 24a to the outer face of the opening.

While the invention has been described with respect to one preferred embodiment, it will be appreciated that many variations, modifications and other applications of the invention may be made.

What is claimed is:

1. A quarter-turn valve comprising:
   a housing formed with a cylindrical socket, an inlet nipple at one side of the socket, and an outlet nipple at the diametrically opposite side of the socket;
   and a cylindrical plug receivable within said socket and having a bore extending diametrically through the plug for establishing communiation between the inlet and outlet nipples in the open position of the plug, but terminating said communication when the plug is turned to its closed position one-quarter turn from said open position, said plug being formed with a finger-piece projecting from the housing for manually rotating the plug to its open, closed or an intermediate position;
   said plug being closed at its bottom, such that the fluid flowing through said bore subjects the plug to a fluid pressure which is balanced on all sides of the plug, thereby facilitating turning of the plug and preventing its accidental ejection when subjected to a high pressure;
   said cylindrical plug being formed with a circular recess for receiving an annular sealing ring on each of the two diametrically opposite sides of the plug midway between the ends of said bore, said sealing rings being aligned with the passageways through the inlet and outlet nipples in the closed position of the plug;
   said housing being formed with cross-bars extending across the nipple openings to prevent unseating of said sealing rings during the rotation of the plug from its closed to its open positions.

2. The valve according to claim 1, wherein the bottom wall of the housing is formed with an opening therethrough communicating with said socket to vent the socket to the atmosphere and thereby to facilitate the manual removal of the plug from the socket for repair or maintenance purposes.

3. The valve according to claim 1, wherein the bottom wall of the housing is formed with axially-extending ribs received within axially extending cavities formed in the bottom wall of the plug for limiting the open and closed rotary positions of the plug with respect to the socket.

4. The valve according to claim 1, wherein said plug is formed with an annular rib at one end adjacent to its finger-piece, which rib is receivable with a snap-action in an annular recess formed in the corresponding end of the socket.

5. The valve according to claim 4, wherein one end of the plug, and the corrresponding end of the socket, are formed with radially-extending projections defining a slot for the reception of a screwdriver or similar implement for prying the plug out of the socket.

6. The valve according to claim 1, wherein each of said nipple openings includes a single cross-bar extending diametrically across the opening in the direction of rotation of the plug.

7. The valve according to claim 1, wherein each nipple opening includes a psi-shaped cross-bar having its central leg extending diametrically across it in the direction of rotation of the plug.

8. A quarter-turn valve comprising:
   a housing formed with a cylindrical socket, an inlet nipple at one side of the socket, and an outlet nipple at the diametrically opposite side of the socket;
   and a cylindrical plug receivable within said socket and having a bore extending diametrically through the plug for establishing communication between the inlet and outlet nipples in the open position of the plug, but terminating said communication when the plug is turned to its closed position one-quarter turn from said open position, said plug being formed with a finger-piece projecting from the housing for manually rotating the plug to its open, closed or an intermediate position;
   said plug being formed with an annular rib at one end adjacent to its finger-piece, said rib being receivable with a snap-action in the annular recess formed in the corresponding end of the socket;
   said one end of the plug, and the corresponding end of the socket being formed with radially-extending projections defining a slot for the reception of a screwdriver or similar implement for prying the plug out of the socket.

9. A quarter-turn valve comprising:
   a housing formed with a cylindrical socket, an inlet nipple at one side of the socket, and an outlet nipple at the diametrically opposite side of the socket;
   and a cylindrical plug receivable within said socket and having a bore extending diametrically through the plug for establishing communication between the inlet and outlet nipples in the open position of the plug, but terminating said communication when the plug is turned to its closed position one-quarter turn from said open position, said plug being formed with a finger-piece projecting from the housing for manually rotating the plug to its open, closed or an intermediate position;
   said cylindrical plug being formed with a circular recess for receiving an annular sealing ring on each of the two diametrically opposite sides of the plug midway between the ends of said bore, said sealing rings being aligned with the passageways through the inlet and outlet nipples in the closed position of the plug; said housing being formed with cross-bars extending across the nipple openings to prevent unseating of said sealing rings during the rotation of the plug from its closed to its open position.

10. The valve according to claim 9, wherein each of said nipple openings includes a single cross-bar extending diametrically across the opening in the direction of rotation of the plug.

11. The valve according to claim 9, wherein each nipple opening includes a psi-shaped cross-bar having its central leg extending diametrically across it in the direction of rotation of the plug.

* * * * *